United States Patent [19]
Rudd

[11] 3,749,421
[45] July 31, 1973

[54] TRACTOR HITCH ASSEMBLY
[76] Inventor: Elbert M. Rudd, Box 222, Eunice, N. Mex. 88231
[22] Filed: Nov. 11, 1971
[21] Appl. No.: 197,654

[52] U.S. Cl................ 280/461 A, 280/503, 172/439
[51] Int. Cl............................................. B62d 53/00
[58] Field of Search .................... 280/405 B, 406 R, 280/456, 460 A, 461 A, 503; 172/439, 451

[56] References Cited
UNITED STATES PATENTS
2,617,660   11/1952   Hadlock........................... 172/439
3,056,458   10/1962   Gray................................. 172/439

Primary Examiner—Leo Fraiglia
Assistant Examiner—Randall Schrecengost
Attorney—Harvey B. Jacobson

[57] ABSTRACT

An elongated drawbar carried in trailing relation to a tractor through a pair of pull arms pivotally engaged with the opposed ends of the drawbar and rotatably affixed to the rear drive axle of a tractor. The drawbar is stabilized by a pair of tractor engaged lift arms and a rearwardly extending stabilizing arm adapted to overlie the drawbar and extend from the tractor to the drawn equipment.

6 Claims, 9 Drawing Figures

PATENTED JUL 31 1973

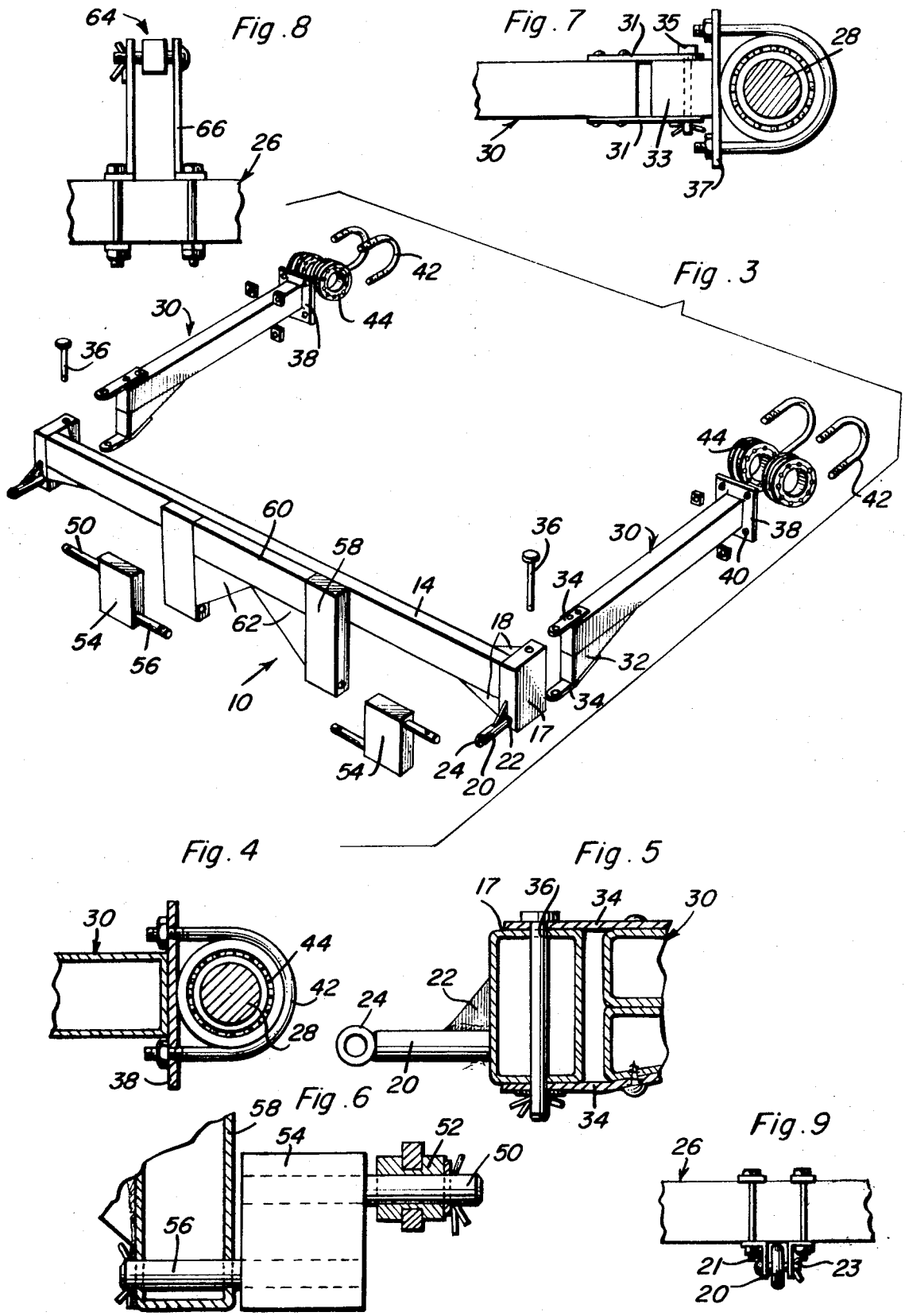

3,749,421

TRACTOR HITCH ASSEMBLY

The present invention generally relates to a tractor hitch assembly, and is more particularly concerned with a hitch which is particularly adapted for the accommodation of drawn equipment substantially wider than that which can normally be handled by the conventional three-point hitch assembly.

Significant objects of the instant invention include the provision of a hitch wherein the drawbar is pulled directly from the rear wheel axle, enabling a more efficient transfer of pulling power and a greater loading capacity, and the provision of an enlarged hitch which is so mounted as to enable a control thereof through lift arms similar to those normally associated with a conventional hitch construction.

Other objects of the invention include the provision of a hitch assembly which incorporates a substantial degree of stability, particularly with regard to side sway or side drift, as well as a hitch assembly which, while highly unique, is of a relatively simple construction capable of providing trouble-free operation over extended periods of time and under normally anticipated relatively rough field conditions.

Basically, the hitch assembly includes an elongated drawbar secured in trailing relation to a tractor by means of a pair of forwardly directed pulling arms which mount to the rear drive axle by bearing units. The drawbar is controlled by a pair of rearwardly extending lift arms, each engaged to the drawbar through swivel units which accommodate the vertical shifting of the drawbar. The hitch assembly, and more particularly the trailing equipment, is in turn stabilized by a stabilizing arm extending from the tractor into overlying relation to the drawbar for pivotal engagement with the drawn equipment.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is an exploded perspective view of the drawbar and pulling arms;

FIG. 4 is an enlarged cross-sectional view taken substantially on a plane passing along line 4—4 in FIG. 1;

FIG. 5 is an enlarged cross-sectional detail taken substantially on a plane passing along line 5—5 in FIG. 1;

FIG. 6 is an enlarged cross-sectional detail taken substantially on a plane passing along line 6—6 of FIG. 1;

FIG. 7 is a view similar to FIG. 4 illustrating a variation in the mounting of the forward end of each pulling arm;

FIG. 8 is a cross-sectional detail taken substantially on a plane passing along line 8—8 in FIG. 1; and FIG. 9 is a cross-sectional detail taken substantially on a plane passing along line 9—9 in FIG. 1.

Figure 1:
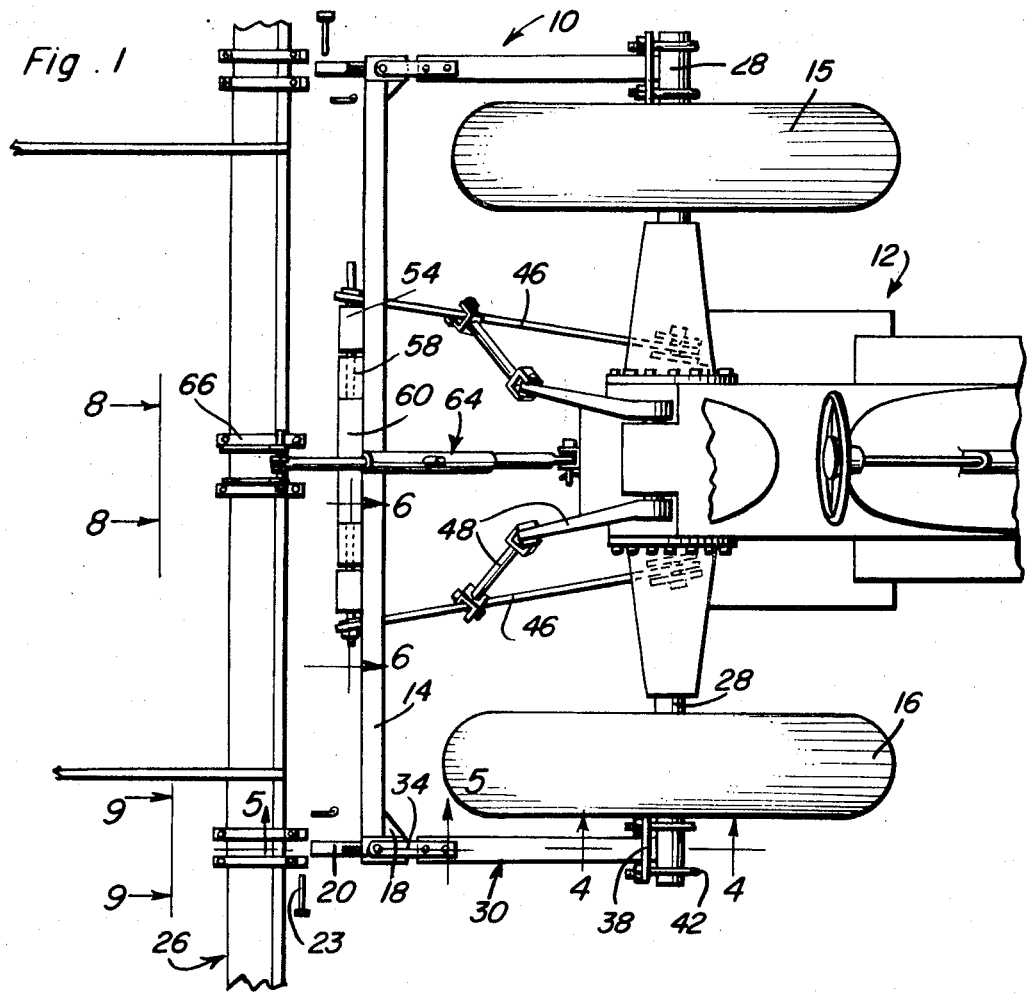
FIG. 1 is a top plan view of the hitch assembly mounted in operative position on a tractor.
Figure 2:
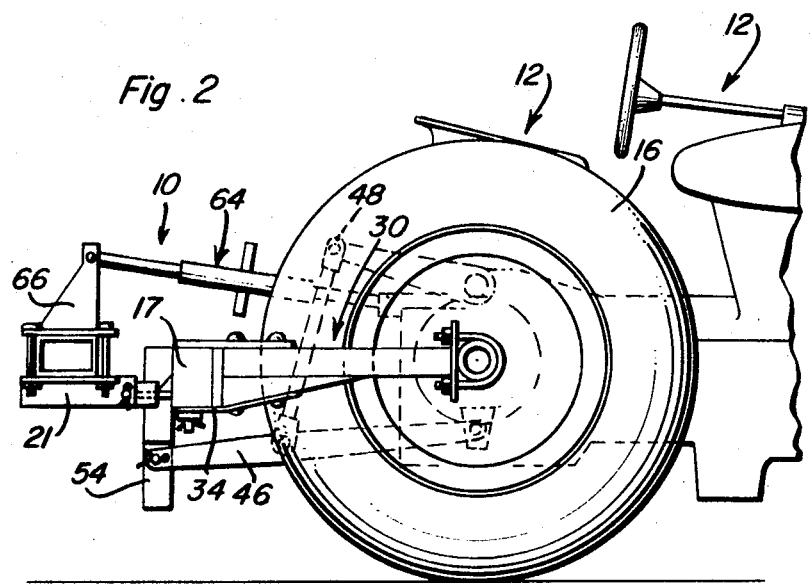
FIG. 2 is a side elevational view of the tractor mounted equipment.

Referring now more specifically to the drawings, reference numeral 10 is used to designate the novel hitch assembly comprising the instant invention. This assembly, as will be apparent from FIGS. 1 and 2, mounts in trailing relation on a conventional self-powered tractor 12.

The hitch assembly 10 includes an elongated drawbar 14, preferably of box beam construction, positionable transversely across the rear of a tractor 12 and of a length so as to extend slightly outward of the enlarged rear tractor drive wheels 16. A rectangular mounting block or box 17 is welded to each end of the bar 14 and extends both downwardly and forwardly therefrom, rigidified relative to the bar 14 by appropriate gusset members 18. Each of the blocks 17 has a rearwardly projecting short equipment mounting arm 20 affixed thereto, the arm being stabilized relative to the block 17 by an appropriate gusset plate 22 and being received between plates 21 on the drawn equipment tool bar 26. Each arm incorporates an eye 24 on the outer end thereof to receive a locking pin 23 therethrough.

The drawbar 14 is directly engaged with the rear axle 28 of the tractor 12 through a pair of forwardly projecting pulling arms 30, this engagement with the axle 28 preferably being just to the outside of the two rear wheels 16 to provide a maximum spread to the pulling force on the drawbar 14. Each pulling arm 30 is in the nature of a hollow box beam of generally equal height with the drawbar 14. The rear end of each pulling arm 30 has a triangular block 32 welded to the lower edge thereof so as to being the height of the pulling arm 30 to that of the corresponding drawbar end block 17. A pair of mounting ears 34 are rigidly affixed to the upper surface of each pulling arm 30 and the lower surface of the corresponding rear block 32 and so orientated as to project rearwardly beyond the pulling arm 30 into overlying relation to the corresponding drawbar end block 17. The rearwardly projecting ends of the ears 34 are apertured with the apertures aligning with a vertical passage through the block 17 for the reception of a pivot pin 36 which is locked into position in any appropriate manner so as to provide for a pivoting connection between the rear of each pulling arm 30 and the drawbar end block 17.

The forward end of each of the pulling arms 30 is provided with a rectangular mounting plate 38. The plate 38 is provided with two pairs of upper and lower openings 40, each pair of which receives the opposite threaded ends of a pair of mounting U-bolts 42 which encircle and clamp the associated plate 38, and hence the end of the pulling arm 30, to bearing units 44 mounted on the axle 28. The bearing units 44 enable a positive mounting of the pulling arms 30 on the axle 28 while at the same time allowing for a free rotational driving of the axle 28 relative to the arms 30 as well as a vertical swinging of the arms 30 about the axle 28 independently of the rotation of the axle.

FIG. 7 illustrates a variation of the mounting of the forward end of each pulling arm 30 wherein upper and lower plates 31 are affixed to the end of the arm 30 and project forwardly therefrom. The forward portions of the plates 31 receive a stub shaft 33 therebetween which pivots about a vertical axis defined by a vertical pivot pin 35. The stub shaft 33 has a vertical rectangular mounting plate 37 affixed thereto. This plate 37 being the equivalent of the plate 38 and likewise clamped to axle mounted bearing units through encircling U-bolts. In this manner, additional flexibility is introduced into the engagement between the pulling arms and the axle 28.

The selective raising and lowering of the drawbar 14 will be effected by a pair of lift arms 46 pivoted at their forward ends, in the conventional manner, to the tractor 12 and manipulated through conventionally mounted and operated lift links 48 engaged between a power unit on the tractor 12 and the lift arms 46.

The rear end of each lift arm 46 rotatably receives a short shaft 50, normally through appropriate bearing means 52, which projects laterally from one end portion of a pivot block 54, the shaft 50 being fixed against withdrawal from the end of the lift arm while at the same time allowing for free rotational movement therebetween. The second end of the pivot block 54 is provided with a second oppositely projecting short shaft 56 which is rotatably received through the lower end of a vertically elongated rectangular upright 58 affixed to and depending from the rear face of the drawbar 14. This lower shaft 56 is also fixed against withdrawal from the upright 58 while at the same time maintaining a free rotational relationship therebetween. If deemed desirable or necessary, the uprights can be braced by a cross beam 60 extending between the upper ends of the uprights 58 and also affixed to the rear face of the drawbar 14, as well as a pair of triangular gusset-like braces 62. It will be appreciated that the two pivot blocks 54 provide for what in effect amounts to a shiftable point of engagement between the ends of the lift arms and the drawbar whereby the slight shifting therebetween which will be experienced during the vertical manipulation of the drawbar 14 can be easily accommodated while at the same time maintaining a positive connection between the lift arms 46 and the drawbar 14 so as to effectively control the movement thereof.

The hitch assembly is completed by the provision of an adjustable stabilizing arm 64 which extends from a forward end pivotally connected to the tractor to a rear end pivotally connected between a pair of upright mounting plates 66 on the piece of equipment 26 itself. Such a stabilizing arm 64 is generally similar to that provided on the conventional three-point hitch and is mounted and manipulated much in the same manner. It will also be appreciated that the stabilizing arm 64 and lift arms 46 introduce a substantial degree of stability into the over-all hitch construction.

From the foregoing, it will be appreciated that a highly unique hitch assembly has been defined. This hitch assembly is particularly adapted for the accommodation of equipment of a substantial width while at the same time providing for a high degree of stabilization.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A hitch assembly comprising an equipment mounting drawbar, a pair of pulling arms secured to said drawbar and projecting laterally forward from said drawbar in spaced generally parallel relation to each other, each pulling arm including a forward end remote from said drawbar, means for securing each forward end to a tractor wheel axle in a manner so as to allow free relative movement therebetween about horizontal and vertical axes, and control means centrally engaged with said drawbar and extending forwardly therefrom for engagement with a tractor, the wheel axle of which is to receive the forward ends of the pulling arms, said pulling arms being fixed to said drawbar by pivot means which enable a pivotal movement therebetween about vertical axes.

2. The assembly of claim 1 wherein said control means includes a pair of laterally spaced lift arms, means pivotally securing one end of each lift arm to said drawbar, said lift arms projecting forwardly from said drawbar for engagement with the associated tractor.

3. The assembly of claim 2 wherein said control means further includes a stabilizing arm overlying said drawbar, said stabilizing arm including a first end projecting rearwardly of the drawbar for engagement with drawbar mounted equipment, and a second end of said stabilizing arm projecting forwardly of the drawbar for engagement with the corresponding tractor.

4. The assembly of claim 3 wherein the means pivotally securing one end of each lift arm to the drawbar comprises a pivot block, said pivot block including a block-like member having a first shaft projecting laterally therefrom and rotatably mounting said one end of the corresponding lift arm, and a second shaft projecting in the opposite direction from said first shaft and rotatably engaging said drawbar.

5. The assembly of claim 2 wherein the means pivotally securing one end of each lift arm to the drawbar comprises a pivot block, said pivot block including a block-like member having a first shaft projecting laterally therefrom and rotatably mounting said one end of the corresponding lift arm, and a second shaft projecting in the opposite direction from said first shaft and rotatably engaging said drawbar.

6. A hitch assembly comprising an equipment mounting drawbar, a pair of pulling arms secured to said drawbar and projecting laterally forward from said drawbar in spaced generally parallel relation to each other, each pulling arm including a forward end remote from said drawbar, means for securing each forward end to a tractor wheel axle in a manner so as to allow free relative movement therebetween, and control means centrally engaged with said drawbar and extending forwardly therefrom for engagement with a tractor, the wheel axle of which is to receive the forward ends of the pulling arms, said control means including a pair of laterally spaced lift arms, means pivotally securing one end of each lift arm to said drawbar, said lift arms projecting forwardly from said drawbar for engagement with the associated tractor, the means pivotally securing one end of each lift arm to the drawbar comprising a pivot block, said pivot block including a block-like member having a first shaft projecting laterally therefrom and rotatably mounting said one end of the corresponding lift arm, and a second shaft projecting to the opposite direction from said first shaft and rotatably engaging said drawbar.

* * * * *